United States Patent
Weber

(10) Patent No.: US 9,345,196 B1
(45) Date of Patent: May 24, 2016

(54) COTTON HANDLING SYSTEM WITH MECHANICAL SEQUENCING

(71) Applicant: DEERE & COMPANY, Moline, IL (US)

(72) Inventor: Scott D. Weber, Bondurant, IA (US)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 14/533,503

(22) Filed: Nov. 5, 2014

(51) Int. Cl.
- *A01D 69/08* (2006.01)
- *A01D 46/08* (2006.01)
- *A01F 15/08* (2006.01)

(52) U.S. Cl.
CPC .............. *A01D 69/08* (2013.01); *A01D 46/08* (2013.01); *A01F 15/085* (2013.01)

(58) Field of Classification Search
CPC ..... A01D 46/08; A01D 46/084; A01D 59/00; A01F 15/07; A01F 15/085
USPC ............. 56/11.4, 11.5, 28, 341; 100/88
See application file for complete search history.

(56) References Cited

U.S. PATENT DOCUMENTS

| | | | | |
|---|---|---|---|---|
| 1,996,918 A * | 4/1935 | Gredell | ............... | F16D 43/18 192/105 CD |
| 2,749,696 A | 6/1956 | Innes | | |
| 4,866,918 A | 9/1989 | Engelstad et al. | | |
| 6,032,446 A * | 3/2000 | Gola | ................ | A01F 15/00 100/151 |
| 6,901,732 B2 * | 6/2005 | Bares | .................. | A01D 46/08 100/88 |
| 7,003,933 B2 * | 2/2006 | Fukumori | ............. | A01F 15/106 100/4 |
| 7,509,785 B2 * | 3/2009 | Fukumori | ............... | A01F 15/07 53/118 |
| 7,818,954 B2 * | 10/2010 | Rempe | ................. | A01D 89/003 56/341 |
| 9,253,948 B2 * | 2/2016 | Olander | ................ | A01F 15/106 |
| 2010/0077716 A1 * | 4/2010 | Sonne | ................ | A01F 15/0883 56/341 |

* cited by examiner

*Primary Examiner* — John G Weiss

(74) *Attorney, Agent, or Firm* — Ingrassia, Fisher & Lorenz PC

(57) ABSTRACT

A cotton handling system is provided for a cotton harvesting machine with an onboard accumulator and a baling chamber. The cotton handling system includes meter, beater and feeder arrangements positioned downstream from one another for processing and conveying cotton from the accumulator to the baling chamber. A sequencing arrangement includes at least one mechanical sequencing device operatively coupled to the feeder arrangement and at least one of the meter and beater arrangements such that at least the feeder arrangement has a start-up activation time that is different from the meter and/or beater arrangements.

20 Claims, 5 Drawing Sheets

COTTON HANDLING SYSTEM WITH MECHANICAL SEQUENCING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to mechanically sequencing subsystems in a cotton harvesting machine.

BACKGROUND OF THE DISCLOSURE

Self-propelled cotton harvesting machines typically come in two varieties, cotton pickers and cotton strippers. Cotton pickers include one or more picking devices configured to pick bolls off of cotton plants in the field, while leaving as much of the plants in place as possible. Cotton strippers, on the other hand, are generally more coarse harvesting machines in which one or more harvesting drums take in some or all of the plant material with the bolls. Thus, the primary difference between the machines is the manner in which the bolls are severed from the ground and separated from the plant. In either case, once removed, the bolls are transferred to an accumulator within the cotton harvester, from which they are fed to a cotton handling system where the bolls are broken down into smaller fibers and conveyed to a baling chamber.

The cotton handling system of a typical cotton harvesting machine (e.g., cotton picker or cotton stripper) has a sequence of cooperating subsystems. Generally, a meter subsystem begins by removing bolls from the accumulator and initially breaking down the bolls. A beater subsystem further breaks down the bolls into cotton fibers. A feeder subsystem then conveys the broken down bolls or cotton fibers to the baling chamber where the cotton is gathered, and in the case of a round module baler, spiral wound and bound with a twine, net or other wrap material, prior to be ejected from the machine for later transport to the ginning mill.

Each subsystem may include powered components, such as one or more powered rollers having protrusions or agitators in the case of the meter and beater subsystems, and one or more powered rollers used to drive a conveyor system to transport the cotton to the baling chamber. Control and power systems, such as one or more electronically controlled electric or hydraulic motors, operate the powered components of the subsystems. To coordinate the sequence and interoperation of the various subsystems, it is conventional to use a rather complex arrangement of sensors, such as speed sensors measuring rotational speed of the rollers, in conjunction with proportional hydraulic valves and software controls to drive each motor selectively, resulting in independent, but coordinated control of the subsystems.

SUMMARY OF THE DISCLOSURE

This disclosure provides a mechanical system for sequencing various cotton handling subsystems within a cotton harvesting machine, which may facilitate stable, coordinated processing of cotton by these subsystems.

In one aspect the disclosure provides a cotton handling system for a cotton harvesting machine having an onboard accumulator and a baling chamber. The cotton handling system includes meter, beater, feeder, and sequencing arrangements. The meter arrangement is positioned proximate an outlet of the accumulator for moving cotton therefrom. The beater arrangement is positioned downstream from the meter arrangement for processing the cotton removed from the accumulator by the meter arrangement. The feeder arrangement is positioned downstream from the beater arrangement for transporting cotton to the baling chamber. The sequencing arrangement includes at least one mechanical sequencing device operatively coupled to the feeder arrangement and at least one of the meter and beater arrangements. The sequencing arrangement causes the feeder arrangement to have a start-up activation time that is different from at least one of the meter and beater arrangements.

In another form, the cotton handling system has a meter arrangement with at least one meter roller positioned proximate an outlet of the accumulator for moving cotton therefrom, a beater arrangement with at least one beater roller positioned downstream from the meter arrangement for processing the cotton removed from the accumulator by the meter arrangement, and a feeder arrangement with at least one feeder roller providing a conveyor positioned downstream from the beater arrangement for transporting cotton to the baling chamber. The system has at least one motor for driving the meter, beater and feeder rollers and at least one centrifugal clutch operatively coupled to the at least one feeder roller and at least one of the meter and beater rollers such that the at least one feeder roller has a start-up activation time that is different from the meter and beater rollers.

Another aspect of the disclosure provides a cotton harvesting machine having an accumulator, a baling chamber, and a cotton handling system. The cotton handling system includes meter, beater and feeder arrangements and an actuation and sequencing arrangement, such as described above.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
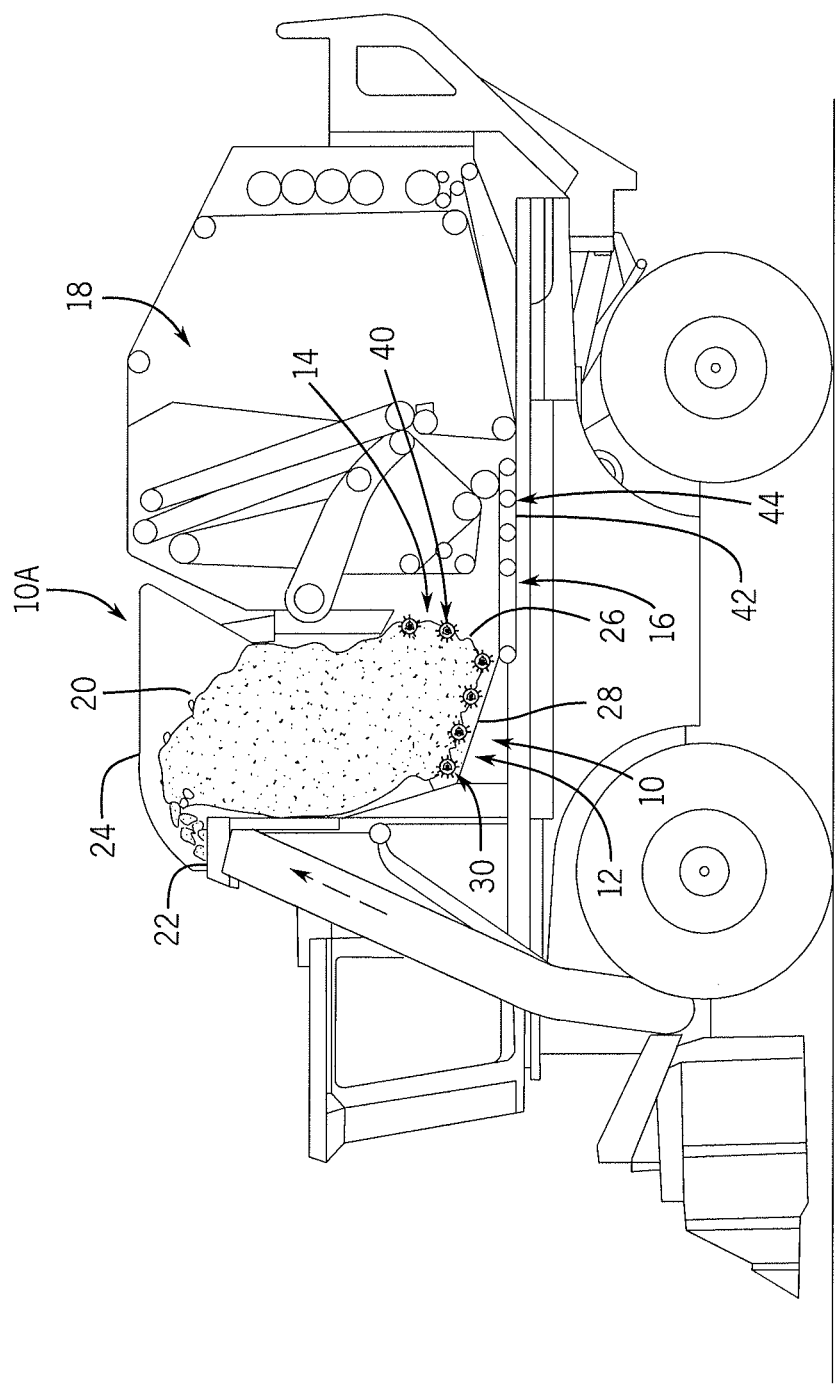
FIG. 1 is simplified side cutaway view of an example cotton harvesting machine, in the form of a cotton picker, having a cotton handling system as disclosed herein, shown prior to activation of the meter subsystem.

The following describes one or more example embodiments of the disclosed cotton handling system, as illustrated in the accompanying figures of the drawings described briefly above. Various modifications to the example embodiments may be contemplated by one of skill in the art, and it should be understood that the cotton handling system may be used with a variety of vehicles in a variety of settings.

The disclosure generally provides a system in which the rotary elements in the various subsystems of the cotton handling system are operatively connected and sequenced through an arrangement of components that includes a mechanical sequencing device. As used herein the term "mechanical" may refer to the activation of a device or system by the physical engagement of parts, especially where engagement occurs without separate monitoring or control of the engagement. For example, power provided from one device (e.g., a motor) to another device (e.g., a roller) via various transmission components (e.g., shafts, gears, sprockets, endless members) may be considered as transmitted "mechanically" between the two devices. The term "mechanical" as used herein may also contemplate various forms (e.g., mechanical, hydraulic and electric) of input to the device or system provided that activation and sequencing is effected or transmitted by engagement of physically mating parts. For example, a power input device (e.g., an electric or hydraulic motor) may be used to impart motion to a mechanical sequencing device that in turn physically engages another mechanical device to transfer the imparted motion. Also, "sequencing" as used herein may refer to the temporal start-up activation of a device or system, the period of activation of a device or system after start-up, and the temporal deactivation of a device or system. "Sequencing" may also contemplate the relative activation, run-time and deactivation of one device or system with respect to one or more other devices or systems.

In certain embodiments, the system may include a mechanical sequencing device including, or in the form of, a centrifugal clutch. The centrifugal clutch may have an input side that receives rotary motion, directly or indirectly, from a motive device, and an output side that transmits that rotary motion after a predetermined rotary speed is achieved. One or more subsystems may be linked to the output side to be driven once the centrifugal clutch engages. One or more other subsystems may be driven independent of the clutch, for example, by being linked to the input side or by being driven by a component not connected to the clutch. Thus, from one perspective, the system may be viewed as a way to reduce the complexity, and to enhance the stability, of the sequencing of the cotton handling system using mechanical devices.

The subsystems may include a meter arrangement for moving cotton bolls from an accumulator (or other on-board receptacle), a beater arrangement for breaking the bolls down into smaller portions, and a feeder arrangement for conveying the bolls from the accumulator to a baler. In certain configurations, the feeder subsystem may be engaged first in time. In this case, the feeder subsystem may be coupled operatively at the input side of the mechanical sequencing device (e.g., centrifugal clutch) or otherwise driven off the motive device (e.g., prior to engagement of the clutch). In the clutch embodiment, one or both of the meter and beater subsystems may be coupled operatively to the output side of the clutch such that they begin operating once a desired input speed is achieved, which causes the clutch to engage. The meter and beater subsystems may activate simultaneously, or they may be activated sequentially using other mechanical devices to delay activation of the latter device (e.g., by using a second centrifugal clutch coupled operatively between the meter and beater subsystems). The clutch may disengage once the input speed is reduced below a threshold level. Power to the meter and/or beater subsystems may be withdrawn before the feeder subsystem shuts down, for example, to permit cleaning of the portion of the cotton handling system between the accumulator and the baler. From another perspective then, the system may be viewed as a mechanical solution for ensuring, via operation of the feeder subsystem before, during, and after operation of the other subsystems, that cotton fibers are transferred from the accumulator to the baler without bottlenecking at an outlet of the accumulator and without remaining between the accumulator and the baler after a baling operation.

Each of the subsystems may be driven by one or more motive components. For example, a single motor may be used to drive a centrifugal clutch in which case the clutch. The feeder subsystem may be operatively coupled to an input side rotating member and the beater and feeder subsystems may be operatively coupled to one or more rotating members at the output side. Thus, from another perspective, the system may be viewed as a way to consolidate power input to the cotton handling system by eliminating the need for separate motive component or controls for each subsystem.

Figure 2:
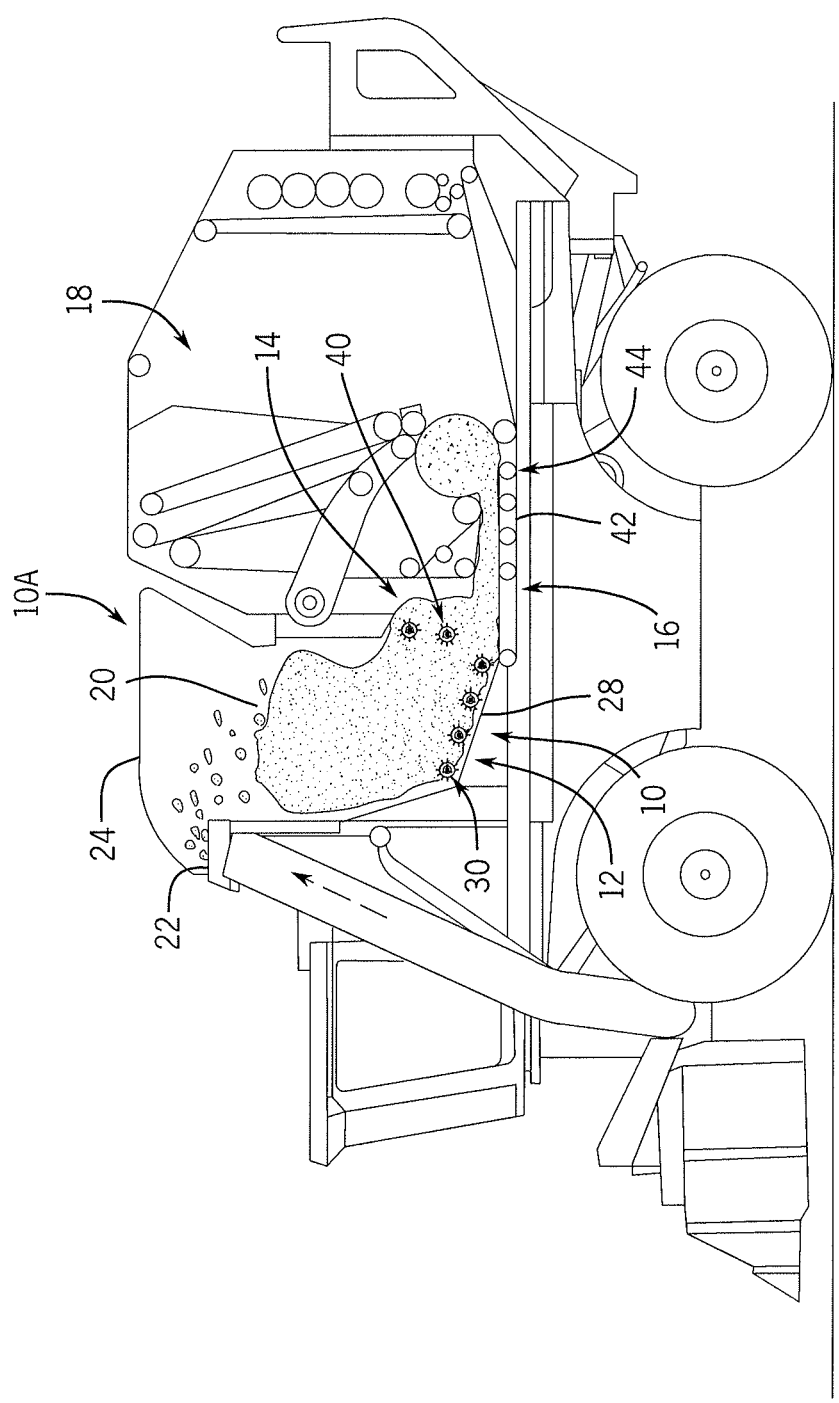
FIG. 2 is a similar view of the cotton picker of FIG. 1 with the cotton handling system depicted during activation of meter, beater, and feeder subsystems.
Figure 3:
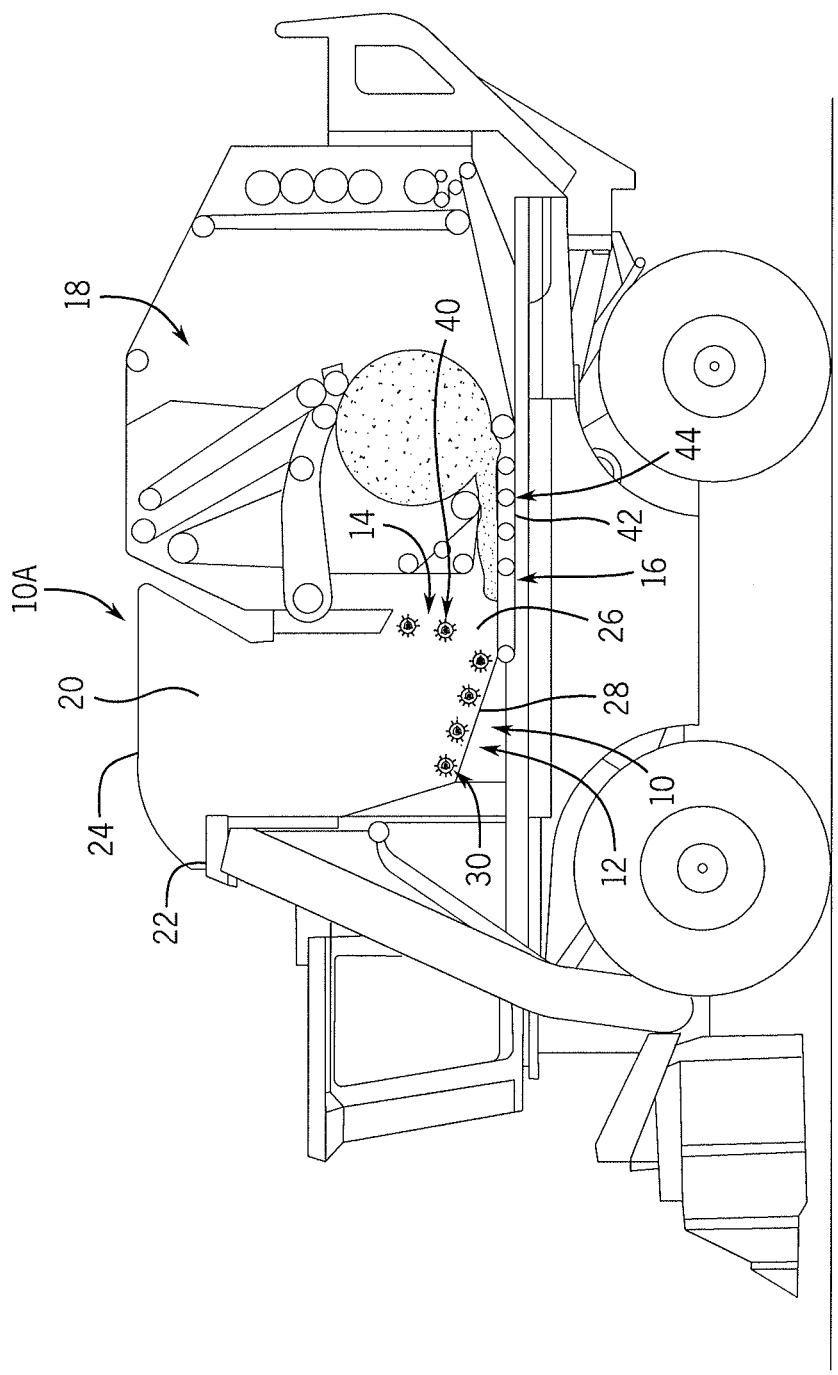
FIG. 3 is another view the cotton picker of FIG. 1 with the cotton handling system depicted after deactivation of the meter subsystem and with the feeder subsystem still activated.

As will become apparent from the discussion herein, the disclosed system may be used advantageously in a variety of cotton processing machinery. With reference to FIGS. 1-3, a cotton harvesting machine (e.g., a cotton picker or cotton stripper), referred to herein as "cotton harvester 10A," may have a cotton handling system 10 which includes a meter arrangement subsystem 12, a beater arrangement subsystem 14, and a feeder arrangement subsystem 16 through which harvested cotton bolls may be processed for baling by an onboard round module builder ("RMB"), or baler 18, after being picked. The RMB, or baler 18, may be any suitable known configuration, such as of the type in self-propelled cotton machines commercially available from Deere & Company of Moline, Ill.

The harvested cotton bolls may be collected into an onboard accumulator 20, which may have an inlet 22 proximate an upper end 24 and an outlet 26 near a lower, rearward end 28. The lower end 28 may angle down rearwardly, which may assist in directing cotton toward the outlet 26, such that the meter subsystem 12 may be at least partially gravity driven. Other accumulator configurations may be implemented, as would be appreciated by one of ordinary skill in the art.

Operator input may be provided via a control console (not shown) in the operator cabin of the cotton harvester 10A to initiate or terminate a baling operation when the accumulator 20 is completely filled or filled to a predetermined volume. Alternatively, one or more sensing devices (not shown), such as various sensors, limit switches and so on, may be incorporated into or near the accumulator 20 to indicate when the accumulator 20 has reached one or more predetermined fill volumes, and these or other sensors, switches or timers may be utilized to determine when the predetermined fill volumes, or the overall accumulator, has been emptied. These sensing devices may be utilized to advance cotton to the accumulator outlet 26, for example, by providing open and close input to a controlled gate (not shown) covering the outlet 26. The predetermined volume of cotton may be less than or equal to the total accumulator volume, such that the accumulator 20 empties after multiple cycles or after a single cycle. Moreover, the sensing devices may trigger activation and deactivation of one or more components of the cotton handling system 10 and/or the baler 18, as discussed in greater detail below.

The meter 12, beater 14, and feeder 16 arrangement subsystems may include any of various types of conveyance devices or mechanisms suitable to move cotton bolls and fibers. For example, one or more rollers, tracks, belts and conveyors may be used. One or more motive devices, such as suitable electric or hydraulic motors, may be used to drive rotation or other movement of the conveyance devices. The one or more motors may be coupled operatively to a single one conveyance device of each subsystem. If a subsystem includes multiple conveyance devices the additional devices my either be directly coupled to, and driven by, the one or motors, or they be coupled to the conveyance device driven by the one or motors and driven actively or passively by the motor-driven conveyance device. By interconnecting the subsystems with various transmission components, a single motive device may be used to drive the meter 12, beater 14 and feeder 16 arrangements. For example, a common electric or hydraulic motor having at least one output shaft is connected to at least one drive gear or sprocket coupled to the conveyance devices. At least one roller within each subsystem may be coupled operatively to a drive gear or sprocket using a direct or indirect connection, such as various intermediate gears, belt or chain drives, pulley systems, etc. Gear or sprocket enlargements or reductions may be used to achieve a desired speed at each subsystem An example embodiment of these subsystems is illustrated in FIGS. 1-4. One or more meter rollers 30, (e.g., the four shown in the figures), may be disposed along the lower end 28 of the accumulator 20 near the outlet 26. The meter rollers 30 may span the width of the accumulator 20, and be spaced apart evenly, or differently such as the spacing between meter rollers 30 varying closer to the outlet 26. The outer circumference of the meter rollers 30 may have spindles or protrusions extending radially outward along their length that serve to engage the cotton bolls and direct them downstream through the cotton handling system 10 as well as begin to break up the bolls into smaller pieces or strands. As shown schematically in FIG. 4, the meter rollers 30 may be coupled operatively to one another such that a single rotating member may drive rotation of all of the meter rollers 30 together. For example, a hydraulic drive motor 32 of the hydraulic system of the cotton harvester 10A and pressurized by a hydraulic pump 34 powered by the engine 36, may be coupled to a gear 38 at an end of one of the meter rollers, such as drive meter roller 30A (the rightmost meter roller in FIG. 4). The other meter rollers 30B-D may be coupled to the drive meter roller 30A. The meter rollers 30B-D can each be coupled directly to meter roller 30A, or they can be coupled together serially with only one of the meter rollers 30B-D (e.g., the adjacent meter roller 30B) coupled directly to the meter roller 30A. The meter rollers 30A-D can be driven synchronously with a 1:1 gear ratio. Alternatively, one or more of the meter rollers 30A-D could be driven at a different rotational speed using gears having different numbers of teeth resulting in different gear ratios. Further, any suitable transmission components (e.g., gears, sprockets, shafts, endless members, etc.) can be used to couple the meter rollers 30A-D to one another and/or to the motor 32.

Figure 4:
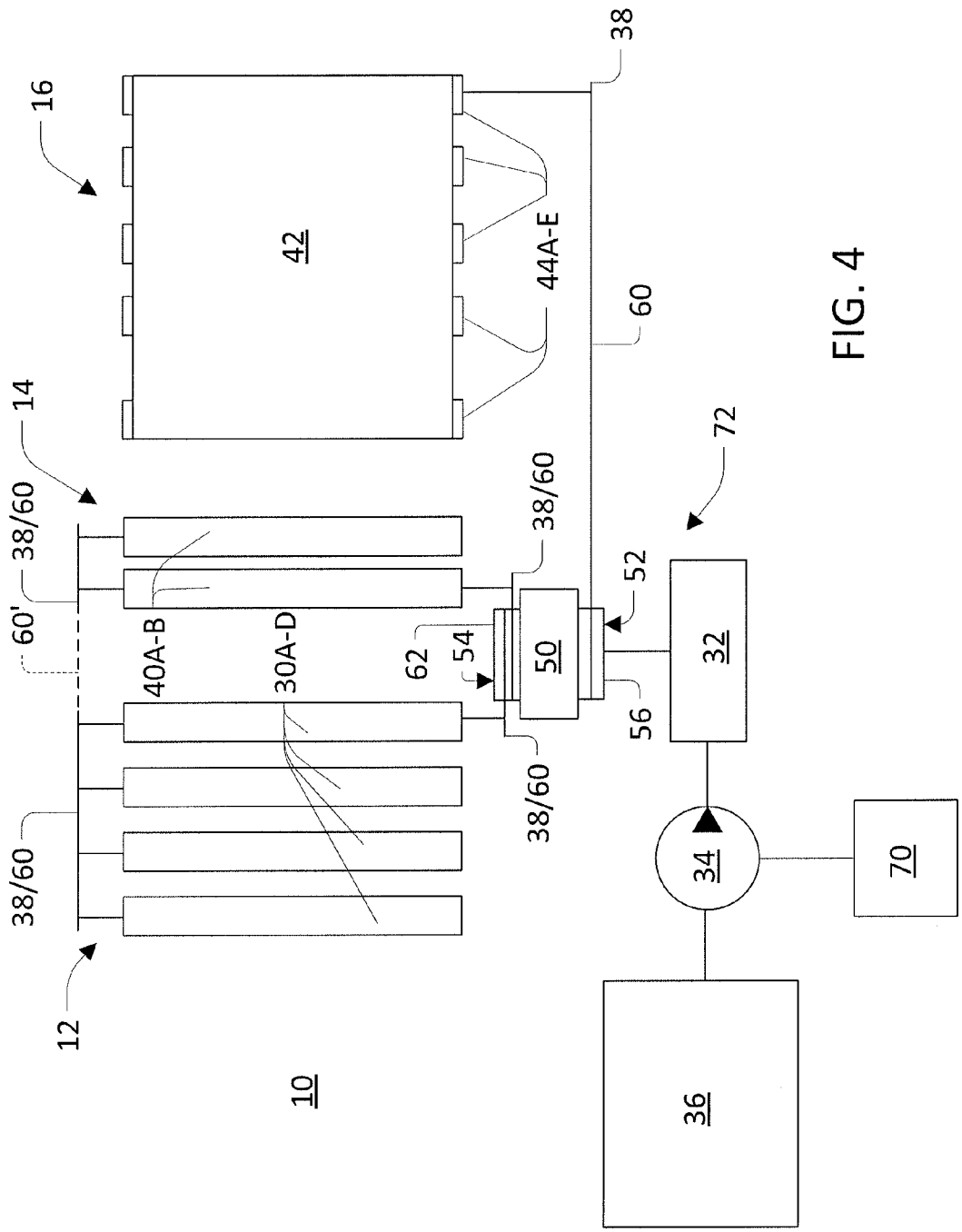
FIG. 4 is a schematic diagram of the example cotton handling system having a mechanical sequencing device.

Like the meter subsystem 12, the beater subsystem 14 may include one or more beater rollers 40 (e.g., two shown). Beater rollers 40 also may be disposed proximate the outlet 26 of the accumulator 20, although the beater rollers 40 may be arranged generally vertically at the rearward side of the accumulator 20. Of course, other locations and orientations of both the meter 30 and beater 40 rollers are possible, as would be appreciated by one of ordinary skill in the art. Also, like the meter rollers 30, the beater rollers 40 may have numerous spindles or projections to move the cotton bolls. The projections of the beater rollers 40 may be the same as the meter rollers 30, or they may be configured differently in order to break up the cotton bolls to a larger degree than the meter rollers 30. A separate motor could be used to drive the beater rollers 40, however, as shown in FIG. 4, the hydraulic motor 32 may also drive the beater rollers 40. For example, the motor 32 may be coupled to a gear 38 at an end of one of the beater rollers, such as drive beater roller 40A (to the left in FIG. 4), and the other beater roller 40B can be coupled directly to the drive beater roller 40A. Alternatively, the beater rollers 40A-B could be coupled to the meter rollers 30A-D, such as by a connection between driven meter roller 30A and beater roller 40A (as shown by the dashed line in FIG. 4), in which case a separate coupling to the motor 32 would be unnecessary. The beater rollers 40A-B can be driven synchronously with a 1:1 gear ratio. Alternatively, the beater rollers 40A-B could be driven at different rotational speeds using different gear ratios. Again, any suitable transmission components (e.g., gears, sprockets, shafts, endless members, etc.) can be used to couple the beater rollers 40A-B to one another and/or to the motor 32.

The feeder subsystem 16 conveys the cotton bolls conveyed from the accumulator 20 and broken-up by the meter 12 and beater 14 subsystems toward and into the baler 18. The feeder subsystem 16 thus may include an endless conveyor 42 (e.g., conveyor belt, track, chain, etc.) driven by one or more feeder rollers 44 (e.g., five shown) spaced apart within the endless conveyor 42 generally from the accumulator outlet 26 to the baler 18. In one example, the feeder rollers 44 may include a tension feeder roller 44A and a drive feeder roller 44E with one or more idler feeder rollers 44B-D spaced apart between the tension 44A and drive 44E feeder rollers. The drive feeder roller 44E may be the roller closest to the baler 18 (rightmost in FIG. 4), and the tension feeder roller 44A may be the feeder roller closest to the outlet 26 (leftmost in FIG. 4). As shown schematically in FIG. 4, the drive feeder roller 44E may be directly coupled to the hydraulic motor 32 via a gear 38. Any suitable transmission components (e.g., gears, sprockets, shafts, endless members, etc.) can be used to couple the drive feeder roller 44E to the motor 32. The other feeder rollers 44A-D may be coupled to the drive feeder roller 44E via the endless conveyor 42. Moreover, the tension feeder roller 44A can be coupled to a tensioning device (not shown) to position or otherwise apply a tensioning force to the tension feeder roller 44A to apply tension on the endless conveyor 42 and keep it engaged with the feeder rollers 44A-44E.

Generally, as mentioned, the coupling between the motive device and the conveyance devices of the cotton handling system 10 is mechanical, and such mechanical coupling provides for a physical engagement of mating devices, for example, to transmit rotational input from one device to one or more mating devices. Thus, a direct shaft coupling of the motor 32 to one of the conveyance devices, such as the drive feeder roller 44E, could be used to transmit rotation. Various transmission components could be used to transmit rotation from same motor 32, or a one or more other motors (not shown), to the other conveyance devices 30A-D, 40A-B, and 44A-D.

Simultaneous activation and operation of the subsystems may be inefficient and subject the cotton handling system 10 to clogging and other operational problems that arise from the feeder subsystem not being up to speed when cotton is delivered to it by the other subsystems. In the past, this problem has been addressed through the use of non-mechanical means (e.g., various control strategies and sensor arrangements) to sequence the subsystems. With this disclosure, however, a straightforward mechanical solution is achieved by using a mechanical sequencing device to couple the motive device to the conveyance devices.

As shown in the example embodiment in FIG. 4, the mechanical sequencing device may be a centrifugal clutch 50. In the illustrated example a single motor is used to activate all of the subsystems of the cotton handling system 10 such that a single clutch is needed. This beneficially reduces the component count, and thereby the cost and complexity, of the system. It should be understood, however, that more than one motive device and more than one sequencing device may be used.

More specifically now, the centrifugal clutch 50 may have an input side 52 and an output side 54 separated from the input side 52 until rotation of the input side 52 is high enough to cause an internal clutch member (e.g., pressure plate and the like, not shown) to move by centrifugal force to couple the input 52 and output 54 sides. As such, the clutch 50 does not "engage" until a predetermined rotation speed has been reached, thereby building a delay into the commencement of those subsystems (e.g., the meter 12 and beater 14 subsystems) coupled to the output side 54 compared to those coupled to the input side (e.g., the feeder subsystem 16). The input 52 and output 54 sides may have rotational components (e.g., sheaves, sprockets, gears, etc.) that can be engaged by various transmission components (e.g., endless members, gears, etc.). In the illustrated example, the input side 52 has a direct coupling with the motor 32, for example, a rotatable member 56 (e.g., sheave, gear or sprocket) of the clutch 50 is mounted directly to a rotating shaft 58 of the motor 32.

To achieve the desired sequencing, the motor 32 and/or the input side 52 of the clutch 50 is coupled to the first subsystem to be activated, which in this case is the feeder subsystem 16. One example is illustrated schematically in FIG. 4 by an endless member 60 (e.g., belt, chain, etc.) coupling the rotatable member 56 at the input side 52 of the clutch 50 with the gear 38 at a shaft of the drive feeder roller 44E. The output side 54 of the clutch 50 is coupled to the meter 12 and beater 14 subsystems. The illustrated example has endless members 60 coupling gears 38 at shafts of meter roller 30A and beater roller 40A to a double rotatable member 62 at the output side 54 of the clutch 50. The double rotatable member 62 could instead be two separate rotatable members mounted to an output shaft. Also, as noted above and depicted in FIG. 4 in dashed line, the beater rollers 40A-B could instead be coupled to the meter rollers 30A-D, for example, by an endless member 60' coupling beater roller 40A to meter roller 30A.

The performance characteristics of the clutch 50 and/or the transmission components coupling the motor 32 to the feeder subsystem 16 may be selected such the feeder subsystem 16 is operating at or near the desired speed when the clutch 50 engages to drive the meter 12 and beater 14 subsystems. The feeder rollers 44A-E may be ramped up to operational speed, putting the endless conveyor 42 into full motion, before the meter 30A-D and/or beater rollers 40A-B begin rotating, which may help ensure that cotton removed from the accumulator 20 is transferred to the baler 18, rather than backing up within the cotton handling system 10. In one example, the feeder rollers 44A-E may operate at about 275 rpm ±about 10 rpm. Once this operational speed has been reached, the clutch 50 may engage to drive the meter rollers 30A-D and the beater rollers 40A-B. As mentioned, the meter and beater rollers may turn at the same or different speeds. In one example, a reduction gear or other ratio changing device is used to drive the beater rollers 40A-B at a higher rate. For example, the meter rollers rate. For example, the meter rollers 30A-D may rotate at about 30 rpm ±about 5 rpm and the beater rollers 40A-B may rotate at about 400 rpm ±about 20 rpm. From these exemplary speeds, it will be appreciated that the secondary subsystems can operate more or less rapidly than the primary subsystem and that the requirement of a certain minimum input speed activating the centrifugal clutch 50 does not limit the speeds that are available to the secondary subsystems, since other mechanical components (other gears, sprockets, etc.) may be used to achieve the desired operational characteristics.

The operation of the cotton handling system 10 can be manually or automatically activated and deactivated. Various controls and switches can be provided in the operator cabin, for example, to allow the operator of the cotton harvester 10A to power the motor 32. Controller 70, which can be the vehicle master controller or a supplemental control dedicated to the cotton handling system 10, can be used to monitor and control operation of the system without manual input. Various sensors and limit switches can also be used to indicate when the accumulator 20 is full or at a prescribed volume to manually or automatically commence activation of the cotton handling system 10. The cabin controls and various accumulator and baler sensing devices can be operatively connected to the controller 70 to provide certain control inputs (e.g., activation and deactivation inputs), as would be understood in the art. It will also be appreciated that there are times when the cotton harvester 10A is operable and at which the cotton handling system 10 as a whole need not be operating (e.g., when the cotton harvester 10A is moving between fields, etc.). Thus, the cotton harvester 10A may include other devices (e.g., sensors, clutches, etc.) for on-demand engagement and disengagement of the entire cotton handling system 10. The controller 70, along with the motor 32 and centrifugal clutch 50, may form part of an actuation and sequencing subsystem 72 of the cotton handling system 10, which can include components dedicated entirely to the activation and sequencing of the cotton handling system 10, or which can include components shared by the cotton handling system 10 and other systems of the cotton harvester 10A.

Generally in operation, once the motor 32 is energized it begins to rotate the input side 52 of the centrifugal clutch 50. This rotation begins to turn the drive feeder roller 44E, which in turn begins to drive the endless conveyor 42 and the other feeder rollers 44A-D. As discussed above, rotation of the input side 52 and the drive feeder roller 44E can be at the same rate as the motor 32, provided the motor is geared or otherwise driven at the desired speed. Other transmission components (e.g., reduction gears and the like) can be used otherwise. As the motor 32 and the input side 52 of the centrifugal clutch 50 reaches its engagement speed, which again can match that a prescribed speed of the feeder subsystem 16, the centrifugal clutch 50 engages to rotate the output side 54 and quickly bring it up to speed. Engagement of the centrifugal clutch 50 thus causes the meter 12 and beater 14 subsystems to engage such that cotton begins to be delivered from the accumulator 20, and broken down, after the feeder subsystem 16 has already been brought up to the speed needed to properly transport cotton to the baler 18.

Figure 5:
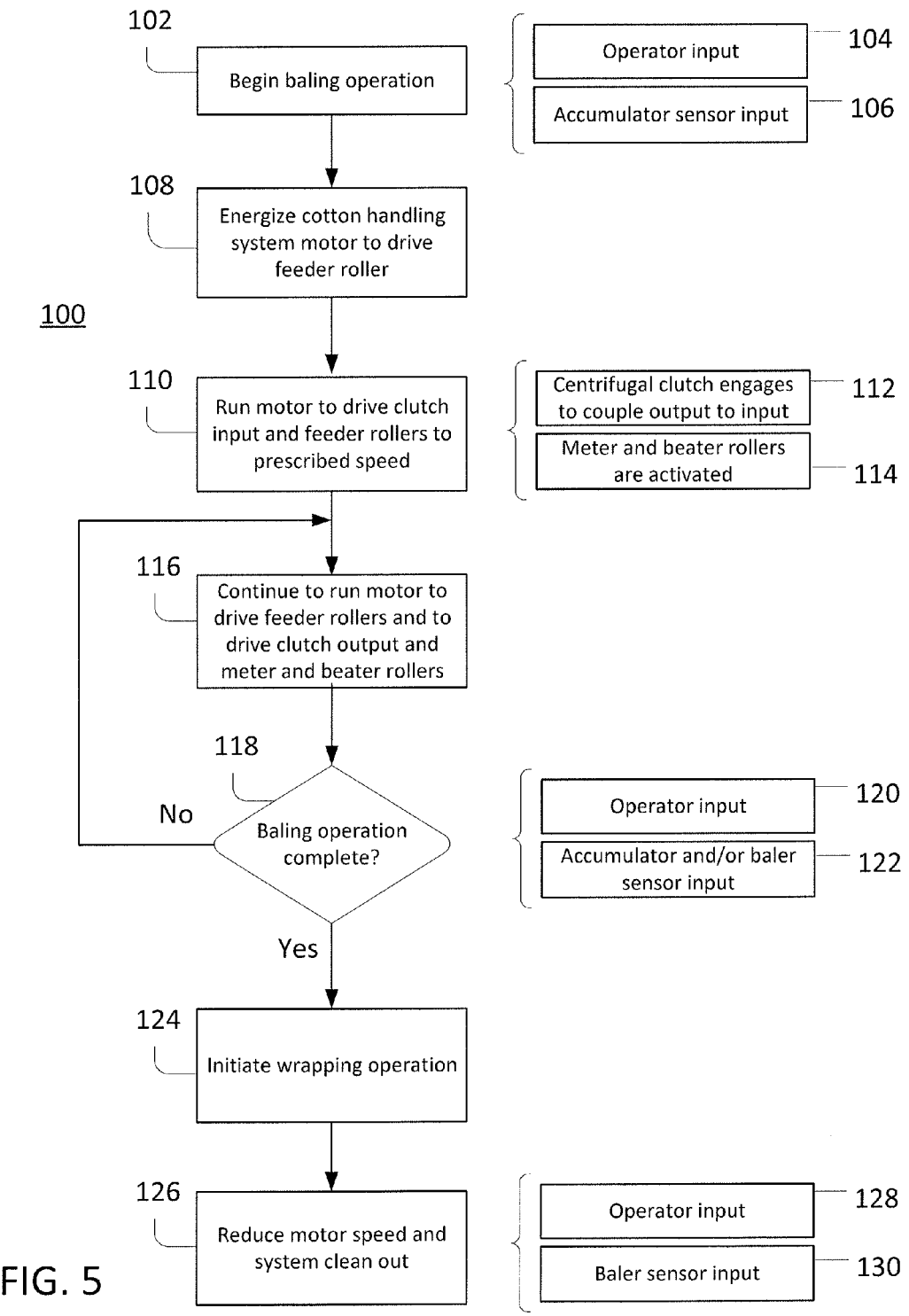
FIG. 5 is a process diagram of a process flow for the example cotton handling system.

Referring now also to FIGS. 5A and 5B, an example method 100 of operating the disclosed mechanically-sequenced cotton handling system 10 in performing a baling operation will now be described. The process may start with the system receiving an input to begin the baling operation 102. The input may be manual input from the vehicle operator 104, or the input may be automatic via one or more sensors 106 in or near the accumulator 20. The input can be received by the controller 70 which energizes 108 the hydraulic pump 34 which in turn pressurizes the motor 32 to rotate the input side 52 of the centrifugal clutch 50 and drive the drive feeder roller 44E. At step 110, the input side 52 and the feeder rollers 44A-E may continue to accelerate until they reach the prescribed speed needed to operate the endless conveyor 42 and to engage the centrifugal clutch 50. As the feeder rollers 44A-E continue to turn the endless conveyor 42, the clutch output 54 begins to rotate 112, which in turn drives 114 the meter rollers 30A-D and the beater rollers 40A-B. Notably, the mechanical nature of the system causes automatic clutch engagement at the prescribed rotational speed, without the need for separate sensor input or operation of the controller 70.

As the meter 30A-D and beater 40A-B rollers come to speed, cotton is taken from the accumulator 20 and broken down before being transferred to the feeder subsystem 16. The motor 32 and centrifugal clutch 50 continue to drive 116 the rollers of the meter 12, beater 14 and feeder 16 subsystems until the baling operation is complete 118. Completion of the baling operation can be indicated by manual input from the operator 120, or automatically by one or more sensors 122 in or near the accumulator 20 or baler 18. For example, as discussed above, the accumulator 20 may include a sensor, limit switch or timer to indicate when it has been emptied or its contents have dropped below a threshold volume, or the baler 18 may include sensors and the like detecting the circumference of the forming bale. Once the system determines that the baling operation has been completed, a bale wrapping operation can be initiated 124, and ultimately the completed and wrapped bale can be ejected from the cotton harvester 10A.

Further, after the bale operation is complete, the system may reduce power to the centrifugal clutch 50 by reducing hydraulic pressure from the hydraulic pump 34 to the motor 32, thereby reducing the speed of input side 52 of the centrifugal clutch 50. Once the threshold speed has been reached, the centrifugal clutch 50 disengages, which decouples the output side 54 and severs the meter 12 and beater 4 subsystems from power. Further, before completely de-energizing the motor 32, the motor 32 and input side 52 of the centrifugal clutch 50 may continue to turn and drive the feeder subsystem 16 to clean out 126 the system by transporting any remaining cotton fibers to the baler 18. Power to the motor 32, and the feeder subsystem 16, may then be removed completely, thereby terminating the handling sequence, based on operator 128 or sensor 130 input.

As compared to previous systems, which may have included motors for each of the meter, beater, and feeder subsystems, and possibly various controllers and sensors to monitor and determine when to activate the subsystems, the arrangement described herein provides a mechanical sequencing system for proper control of the various subsystems. It may also eliminate certain components, thereby reducing cost and complexity of the system. It may also improve efficiency (e.g., by avoiding power loss due to parasitics) as compared to sensor-based systems. Additionally, the mechanical arrangement disclosed may reduce or eliminate variations in speed between the subsystems (e.g., caused by fouled or miscalibrated sensors), which otherwise can lead to clumping of the cotton and clogging of the cotton handling system 10 and/or the baler 18, and thereby increasing harvesting time and expense. The mechanical system disclosed thus provides more stable and uniform operation.

As will be appreciated by one skilled in the art, various aspects of the disclosed subject matter may be embodied as a computer-implemented method, a system, or a computer program product. Accordingly, certain implementations may be implemented entirely as hardware, entirely as software (including firmware, resident software, micro-code, etc.) or as a combination of software and hardware aspects. Furthermore, certain implementations may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain implementations are described herein with reference to flowchart illustrations and/or block diagrams of methods, apparatus (systems) and computer program products according to implementations of the disclosure. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which includes one or more executable instructions for implementing the specified logical function(s). Further, in some alternative implementations, the functions noted in the various blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A cotton handling system for a cotton harvesting machine having an onboard accumulator and a baling chamber, the system comprising:
    a meter arrangement positioned proximate an outlet of the accumulator for moving cotton therefrom;
    a beater arrangement positioned downstream from the meter arrangement for processing the cotton removed from the accumulator by the meter arrangement;
    a feeder arrangement positioned downstream from the beater arrangement for transporting cotton to the baling chamber; and
    a sequencing arrangement including at least one mechanical sequencing device operatively coupled to the feeder arrangement and at least one of the meter and beater arrangements such that the feeder arrangement has a start-up activation time that is different from at least one of the meter and beater arrangements.

2. The system of claim 1, further including at least one motive device for driving the meter, beater and feeder arrangements, and wherein the at least one motive device includes a motor and the at least one mechanical sequencing device includes a centrifugal clutch.

3. The system of claim 2, wherein the motor is the only motive device and the centrifugal clutch is the only sequencing device driving and sequencing the meter, beater and feeder arrangements.

4. The system of claim 2, wherein the motor and the meter arrangement are coupled to an input side of the centrifugal clutch and the feeder arrangement is coupled to an output side of the centrifugal clutch, and wherein the output side of the centrifugal clutch couples to the input side only after the input side reaches a threshold speed.

5. The system of claim 2, wherein each of the meter, beater and feeder arrangements includes one or more rollers, and wherein at least one meter roller and at least one beater roller are operatively coupled to an output side of the centrifugal clutch and at least one feeder roller is operatively coupled to an input side of the centrifugal clutch.

6. The system of claim 5, wherein a single motor is coupled to the input side of the centrifugal clutch that drives the meter, beater and feeder arrangements.

7. The system of claim 5, wherein each of the meter, beater and feeder arrangements have multiple rollers, including for each arrangement at least one drive roller mechanically coupled to the centrifugal clutch and at least one driven roller mechanically coupled to the driven roller of the associated arrangement.

8. The system of claim 7, wherein the feeder rollers are spaced apart and support and move an endless conveyor.

9. The system of claim 7, wherein the input and output sides of the centrifugal clutch each have at least one rotatable member, and the at least one drive meter roller, the at least one drive beater roller and the at least one drive feeder roller each has a coupling member, and
    wherein the at least one rotatable member of the centrifugal clutch output side and the at least one drive feeder roller are coupled by an endless member and the at least one rotatable member of the centrifugal clutch input side and the at least one drive meter and beater rollers are coupled by at least one endless member.

10. The system of claim 9, wherein the endless members are one of chains and belts.

11. A cotton handling system for a cotton harvesting machine having an onboard accumulator and a baling chamber, the system comprising:
    a meter arrangement including at least one meter roller positioned proximate an outlet of the accumulator for moving cotton therefrom;
    a beater arrangement including at least one beater roller positioned downstream from the meter arrangement for processing the cotton removed from the accumulator by the meter arrangement;
    a feeder arrangement including at least one feeder roller providing a conveyor positioned downstream from the beater arrangement for transporting cotton to the baling chamber; and
    an actuation and sequencing arrangement including at least one motor for driving the meter, beater and feeder rollers and at least one centrifugal clutch operatively coupled to the at least one feeder roller and at least one of the meter and beater rollers such that the at least one feeder roller has a start-up activation time that is different from the meter and beater rollers.

12. The system of claim 11, wherein the actuation and sequencing arrangement has a single motor and a single centrifugal clutch, and wherein the motor is coupled to an input side of the centrifugal clutch that couples to an output side of the centrifugal clutch only after the input side reaches a threshold speed.

13. The system of claim 11, wherein each of the meter, beater and feeder arrangements have multiple rollers, including for each arrangement at least one drive roller mechanically coupled to the centrifugal clutch and at least one driven roller mechanically coupled to the driven roller of the associated arrangement.

14. A cotton harvesting machine, comprising
an accumulator;
a baling chamber; and
a cotton handling system, including:
- a meter arrangement positioned proximate an outlet of the accumulator for moving cotton therefrom;
- a beater arrangement positioned downstream from the meter arrangement for processing the cotton removed from the accumulator by the meter arrangement;
- a feeder arrangement positioned downstream from the beater arrangement for transporting cotton to the baling chamber; and
- an actuation and sequencing arrangement including at least one motor for driving the meter, beater and feeder arrangements and at least one centrifugal clutch operatively coupled to the feeder arrangement and at least one of the meter and beater arrangements such that the feeder arrangement has a start-up activation time that is different from at least one of the meter and beater arrangements.

15. The cotton harvesting machine of claim 14, wherein the at least one motor and the meter arrangement are coupled to an input side of the at least one centrifugal clutch and the feeder arrangement is coupled to an output side of the at least one centrifugal clutch.

16. The cotton harvesting machine of claim 14, wherein the actuation and sequencing arrangement has a single motor and a single centrifugal clutch, and wherein the motor is coupled to an input side of the centrifugal clutch that couples to an output side of the centrifugal clutch only after the input side reaches a threshold speed.

17. The cotton harvesting machine of claim 14, wherein each of the meter, beater and feeder arrangements includes one or more rollers.

18. The cotton harvesting machine of claim 17, wherein each of the meter, beater and feeder arrangements have multiple rollers, including for each arrangement at least one drive roller mechanically coupled to the centrifugal clutch and at least one driven roller mechanically coupled to the driven roller of the associated arrangement.

19. The cotton harvesting machine of claim 18, wherein the feeder rollers are spaced apart and support and move an endless conveyor member.

20. The cotton harvesting machine of claim 19, wherein the input and output sides of the centrifugal clutch each have at least one sprocket, and the at least one drive meter roller, at least one drive beater roller and at least one drive feeder roller each has a sprocket, and
wherein the sprockets of the centrifugal clutch output side and the at least one drive feeder roll are coupled by an endless flexible member and the sprockets of the centrifugal clutch input side and the at least one drive meter and beater rollers are coupled by at least one endless flexible member.

* * * * *